United States Patent [19]

Carr et al.

[11] 4,405,507

[45] Sep. 20, 1983

[54] OZONE ABATEMENT CATALYST HAVING IMPROVED DURABILITY AND LOW TEMPERATURE PERFORMANCE

[75] Inventors: William F. Carr, Monmouth Junction; James M. Chen, Rahway, both of N.J.

[73] Assignee: Engelhard Corporation, Iselin, N.J.

[21] Appl. No.: 370,427

[22] Filed: Apr. 21, 1982

Related U.S. Application Data

[62] Division of Ser. No. 218,374, Dec. 22, 1980, Pat. No. 4,343,776.

[51] Int. Cl.³ .................. B01J 21/04; B01J 23/40; B01J 23/89
[52] U.S. Cl. .................. 252/466 B; 252/472
[58] Field of Search .................. 252/466 B, 472

[56] References Cited

U.S. PATENT DOCUMENTS

| | | | |
|---|---|---|---|
| 3,260,627 | 7/1966 | Logan et al. | 149/1 |
| 3,433,580 | 3/1969 | Deuringer | 423/210 |
| 3,516,783 | 6/1970 | Blanchard | 423/210 |
| 3,883,444 | 5/1975 | Maselli et al. | 252/466 B |
| 4,003,955 | 1/1977 | Hayes | 252/466 B |
| 4,119,529 | 10/1978 | Hayes et al. | 252/466 B |
| 4,171,288 | 10/1979 | Keith et al. | 252/466 B |

FOREIGN PATENT DOCUMENTS 1409100  10/1975  United Kingdom .

*Primary Examiner*—W. J. Shine

[57] ABSTRACT

Precious metal ozone decomposition catalyst, its stabilization and method for decomposing ozone for purification and detoxification purposes by contacting with a decomposition catalyst containing a platinum group metal and a nonprecious Group VIII metal oxide or aluminate on a support, favoring exposure to ozone of the platinum group metal over the nonprecious metal oxide or aluminate, the arrangement favoring maximum conversion per unit volume and system pressure drop by catalytic element configuration within a given catalyst volume.

2 Claims, No Drawings

OZONE ABATEMENT CATALYST HAVING IMPROVED DURABILITY AND LOW TEMPERATURE PERFORMANCE

This is a division of application Ser. No. 218,374, filed Dec. 22, 1980, now U.S. Pat. No. 4,343,776.

This invention relates to an efficient, ozone resistant precious metal ozone decomposition catalyst and to a method for decomposing ozone under mild or ambient temperature conditions suitable for purification and detoxification purposes, and to a method for functionally stabilizing platinum group metal catalysts exposed to ozone through the use of a platinum group metal or composition in conjunction with a nonprecious Group VIII metal oxide.

BACKGROUND OF THE INVENTION

The generation and use of oxidizing agents such as chlorine (through hypochlorous acid), oxygen and ozone for treating and for disinfecting and/or removing undesirable organic materials such as odor and bacteria from waste water, sewage, drinking water environmental air and industrial stack gases is generally known (ref. U.S. Pat. Nos. 4,167,466, 3,342,545 and 3,260,627). The use of ozone for such purposes, however, has been limited, thus far, due to inefficiency in production (ref. U.S. Pat. Nos. 3,883,413 and 3,702,973) and the fact that ozone is biologically toxic and remains chemically active, even in concentrations of less than 1 ppm. As a result, essential organic materials, animal and human life in surrounding areas can be adversely affected by ozone-residues.

The toxic properties of ozone are also particularly troublesome in enclosed areas in which relatively low concentrations (i.e. 0.2-1 ppm) are generated or maintained for long periods, such as in the operation of electrical devices under dry atmospheric conditions, or already present in nature. Such may include, for instance, the prolonged operation of corotrons in xerographic copiers in an office environment or found in airplanes operating above 37,000 feet. Despite its relative instability under moist ambient conditions, the high toxic properties of ozone make it necessary and prudent to further hasten chemical breakdown

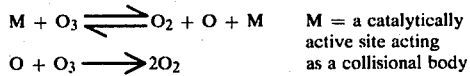

$$M + O_3 \rightleftharpoons O_2 + O + M \quad M = \text{a catalytically active site acting}$$
$$O + O_3 \longrightarrow 2O_2 \quad \text{as a collisional body}$$

wherever the rate of generation even slightly exceeds the rate of natural decomposition, so as to maintain a concentration no higher than about 0.25 ppm sea level equivalent, or 0.1 ppm over any period exceeding 4 hours (ref. "Atmospheric Environment"; Vol. 6, pg. 707–714; Pergamon Press 1972; F.A.A. Rules, Federal Register Vol. 45, #14; Jan. 21, 1980).

For air purification and similar purposes, reactants and catalysts such as activated charcoal (ref. U.S. Pat. Nos. 1,961,878 and 3,516,783) silver, platinum and some other metallic oxides have been tried, in the past, with varying degrees of success (ref. U.S. Pat. Nos. 3,352,642 and 3,433,580).

Unfortunately, however, ozone possesses catalytic-inhibiting as well as the above-indicated toxic biological properties, such that normally efficient precious metal catalysts are subject to an early and substantial loss in efficiency under normal practical reaction conditions, and the less expensive metal catalysts found to be too demanding with respect to energy input and generally unable to operate efficiently at high space velocities.

It is an object of the present invention to obtain an ozone-decomposition catalyst which retains a high level of efficiency when exposed to ozone, and is capable of maintaining the catalytic decomposition of ozone on a long-term basis at high space velocities under mild or ambient reaction temperature conditions.

It is a further object of the present invention to develop a method for stabilizing platinum group metal catalysts exposed to ozone or ozone-containing gases.

A still further object is to broaden the utilization of ozone as an oxidizing agent without harm to the environment from residual amounts of ozone-containing gases in the resulting effluent.

It is an additional object of the present invention to develop a method for increasing the efficiency of low temperature catalytic decomposition of ozone by using a platinum group metal such as palladium in combination with a base metal as catalytic components.

THE INVENTION

The above objects are achieved in accordance with the present invention with the discovery that catalytic decomposition of ozone can be effected by contacting ozone or an ozone-containing medium, usefully in a wide range of concentrations, with a precious metal catalyst containing, as active material:
 (a) at least one platinum group metal or catalytically active compound thereof, and
 (b) at least one nonprecious Group VIII metal oxide or aluminate;
the arrangement of active material favoring exposure to ozone of the platinum group over the nonprecious metal oxide or aluminate.

In further accordance with this discovery, it is now found possible to rapidly stabilize and efficiently operate a platinum group metal catalyst exposed to ozone or ozone-containing gases by initially incorporating as active material thereof the above-indicated components the arrangement of metals again favoring exposure to ozone of the platinum group over the nonprecious metal oxide or aluminate.

As a result of the ability of such combined catalyst to efficiently maintain a high rate of catalytic decomposition of ozone, it now becomes more feasible to utilize ozone as an oxidizing agent in high concentrations for treating gases, for instance, without undue concern over subsequent removal of excess ozone from the effluent. In addition, it is now possible to maintain a more healthful environment in an aircraft with a minimum of weight and equipment.

A suitable ozone decomposition catalyst, for the above purposes within the present invention, includes, for instance:
 (a) a carrier or support, exemplified by, but not limited to, one or more porous inert solid refractory skeletal structures such as a honeycomb-type support, a wire mesh or filter cartridge comprising alpha alumina, silicon nitride, cordierite, zircon-mullite, lithium-aluminum silicates, metal monoliths such as Hasteloy ™, Fecralloy ™, aluminum or similar materials known to the catalyst art, preferably having a plurality of flow-through channels oriented in the general direction of gas flow. Suitable catalyst supports and arrangements thereof for ozone decomposition purposes are described in connection with various reactions, for instance, in Keith et al., U.S. Pat. No. 3,441,381; Murphy U.S. Pat. No. 3,662,540; Givens et al. U.S. Pat. Nos. 3,969,083 and 4,021,203; and Pfefferle, Canadian Pat. No. 1,020,593;

(b) at least one platinum group metal including platinum, palladium, rhodium or catalytically active compound thereof such as the corresponding oxides; and (c) at least one nonprecious Group VIII metal oxide or aluminate, such as an oxide or aluminate of iron, cobalt and nickel; this group is inclusive of at least one of CoO, $CoAl_2O_4$, $Fe_2O_3$ and NiO and may be applied with an alumina slip.

As noted above, it is preferred that the arrangement of active metals favor exposure to ozone of the more active platinum-group metal component such as palladium over the nonprecious Group VIII metal oxide or aluminate component. This can be conveniently accomplished, for instance, by initially applying the nonprecious metal oxide as an alumina slip prior to application of the platinum group metal component.

For purposes of the present invention, complete or substantial coverage (i.e. 80%-100% by area) of the nonprecious metal oxide or corresponding aluminate by the platinum group component is permissible, provided the weight ratio of platinum group metal-to-nonprecious metal oxide of active catalytic material is kept within the weight ratio of about 1.0:0.5–5.0.

In accordance with the present invention, it is found convenient to utilize the nonprecious catalytic metal such as the oxide applied with an alumina slip onto an inert support such as a ceramic or metal support of the types indicated above.

Suitable catalytically-active material can be applied upon the external surface of the skeletal support either as a continuous thin deposit or as a discontinuous thin deposit. Such material usefully has a surface area, including the area of pores in the surface, of at least about 20, and preferably 50 meter$^2$/g or greater.

In accordance with the present invention, it is also found convenient to utilize an active amount of one or more of the platinum group metal components in a total combined concentration of about 0.2%–1% by weight of catalyst or higher and an active amount of one or more nonprecious Group VIII metal oxides and/or aluminates in a total combined concentration of about 0.3–1% by weight of catalyst or higher, provided the above-indicated weight ratio of 1.0:0.5–5.0 is maintained.

Where a honeycomb-type support is utilized, the concentration is also conveniently expressed with respect to the volume of the catalyst body. When so expressed, the platinum group metal is preferably utilized collectively in a concentration of about 1.0–7.00 Troy Oz/ft$^3$ (i.e. T.O./ft$^3$) or higher, if desired, and the nonprecious oxide or aluminate in combination with the washcoat is preferably utilized in a concentration of about 0.5–3.0 g/in$^3$, such as 1.6 g/in$^3$.

The support and applied catalyst materials above-described can be usefully employed in the form of a monolith or, where convenient, the ozone or ozone-containing gas can be passed through one or a plurality of spaced catalyst beds or monoliths arranged in series within a reaction zone. For such purpose, 1–6 or more separate beds or honeycomb sections are found acceptable, each mounted section being usefully separated by a distance of from about $\frac{1}{8}''$ up to about 1". Such sections can vary in thickness from about $\frac{1}{4}''$–12" or greater, depending upon the space velocity utilized, the permissible pressure drop, the temperature of the unreacted input gas, the ozone concentration, and the permissible size, shape and weight of the reactor.

Catalytic decomposition of ozone can be usefully carried out with the above-described catalyst under moderate conditions inclusive of a pressure of about 0.5–4.0 Atm. or about 7 psia–56 psia; an input temperature below about 500° F. and preferably, but not exclusively, within the range of 50° F.–500° F., although lower or higher ranges are possible; and at a space velocity in excess of 300,000/hr.$^{-1}$ S.T.P. (i.e. 60° F. and 1 Atm.). Generally speaking, a range of about 300,000/hr.$^{-1}$–550,000/hr$^{-1}$ S.T.P. is considered practical and acceptable for purposes of the present invention.

This invention is further described, although not limited by the following examples:

EXAMPLE I

Two (2) $1\frac{1}{2}''$ thick cordierite honeycomb test monolith supports obtained from Corning Glass Company ("Corning 300"), measuring 4" in diameter and identified as Sample 1 and Sample 2, are dipped respectively into 40% solid slurrys of $Al_2O_3$ as Sample 1 and CoO+$Al_2O_3$ (1:1 by weight) as Sample 2, removed, shaken, and air sprayed to remove excess slurry, dried at 200° F. for two (2) hours, calcined at 900° F. for four (4) hours, and thereafter cooled to obtain indicated desired concentrations. Both samples are then immersed for 5 minutes in a solution of sodium tetrachlor pallidate salt 16.5 g/liter Pd, removed, shaken and air-sprayed to remove excess solution. Both samples are fixed with reducing agent, washed chloride-free, and then dried for 4 hours at 200° F. The cooled samples are then identically mounted in duplicate canister reactors with their channels parallel to the expected gas flow and tested by passing a 1.5 ppm ozone-air mixtures* through the canisters at an input temperature of 250° F., a pressure of 20 psia and at a space velocity of 400,000 hr$^{-1}$ S.T.P. Residual ozone concentrations in the resulting effluents are determined with a CSI Chemiluminescence Ozone Analyzer and reported in TABLE I below.

*Using a Welsbach T-40-A ozonator

TABLE I

| Test Sample | Active Coat | Weight/Volume | Input Temp. (°F.) | Age (hours) | Ozone conversion (% by Vol.) |
|---|---|---|---|---|---|
| 1 | Pd<br>$Al_2O_3$ | 3.45 T.O./ft$^3$<br>1.50 g/in$^3$ | 250° | 80 | 85.5** |
| 2 | Pd<br>CoO + $Al_2O_3$ | 3.45 T.O./ft$^3$<br>1.7 g/in$^3$ | 250° | 300 | 93 |

**Average determination

EXAMPLE II

Two (2) cordierite honeycomb test monolith supports of the same type are coated as in Samples 1 and 2 of Example I (identified hereinafter as Samples 3 and 4) and identically mounted in duplicate canister reactors as in EXAMPLE I for treating an air stream containing 1.5 ppm ozone at an inlet temperature of 250° F., a pressure of 35 psia and at a space velocity of 415,000 hr$^{-1}$ S.T.P. Residual ozone concentrations are determined as before but over a 50 hour perior to determine the amount and rate of catalyst deactivation and reported in TABLE II below.

TABLE II

| Test Sample | Active Coat | Weight/ Volume | Pressure (psia) | Input Temp. (°F.) | Age (hours) | Ozone conversion (% by Vol.) |
| --- | --- | --- | --- | --- | --- | --- |
| 3 | Pd Al₂O₃ | 3.5 T.O./ft³ 1.6 g/in³ | 35 | 250° | 0 | 98 |
|   |   |   |   |   | 5 | 90 |
|   |   |   |   |   | 10 | 88.8 |
|   |   |   |   |   | 20 | 87 |
|   |   |   |   |   | 30 | 86 |
|   |   |   |   |   | 40 | 85.5 |
|   |   |   |   |   | 50 | 85.5 |
| 4 | Pd CoO + Al₂O₃ | 3.5 T.O./ft³ 1.6 g/in³ | 35 | 250° | 0 | 98 |
|   |   |   |   |   | 5 | 95 |
|   |   |   |   |   | 10 | 94.2 |
|   |   |   |   |   | 20 | 93 |
|   |   |   |   |   | 30 | 93 |
|   |   |   |   |   | 40 | 93 |
|   |   |   |   |   | 50 | 93 |

EXAMPLE III

Two (2) commercial cordierite honeycomb test monolith supports identified as "Corning 400" are coated as in EXAMPLE I except that a concentration of 7.0 T.O. Pd/ft³ is utilized rather than 3.5 T.O./ft³, and a space velocity of 550,000 hr$^{-1}$ S.T.P. is employed over a temperature range of 50° F.–300° F. The Samples, hereafter identified as numbers 5 and 6, are checked for ozone conversion in accordance with EXAMPLE I, after 20 hours of operation and the results reported in TABLE III below.

TABLE III

| Test Sample | Active Coat | Weight/ Volume | Pressure (psia) | Input Temp. (°F.) | Age (hours) | Ozone conversion (% by Vol.) |
| --- | --- | --- | --- | --- | --- | --- |
| 5 | Pd Al₂O₃ | 7.0 T.O./ft³ 1.6 g/in³ | 30 | 50° | 20 | 23 |
|   |   |   |   | 100° | 20 | 27 |
|   |   |   |   | 150° | 20 | 40 |
|   |   |   |   | 200° | 20 | 64 |
|   |   |   |   | 300° | 20 | 95* |
| 6 | Pd CoO + Al₂O₃ | 7.0 T.O./ft³ 1.6 g/in³ |   | 50° | 20 | 35 |
|   |   |   |   | 100° | 20 | 41 |
|   |   |   |   | 150° | 20 | 58 |
|   |   |   |   | 200° | 20 | 77 |
|   |   |   |   | 300° | 20 | 95 |

*Possible malfunction in CSI analyzer.

EXAMPLE IV

Four (4) cordierite honeycomb test monolith supports coated, mounted and tested in the manner of EXAMPLES I–II, except that NiO is used in place of cobalt oxide, and palladium is supplied in a concentration of 3.0 T.O./ft³ to obtain ozone-conversion results similar to that reported in EXAMPLES I–II and TABLES I–II.

EXAMPLE V

Four (4) cordierite honeycomb test monolith supports coated, mounted and tested in the manner of EXAMPLES I–II, except that the platinum group metal consists of a 50:50 concentration by weight of Pd and Pt in a total concentration of 7.0 T.O./ft³ obtain results similar to that reported in EXAMPLES I–II and TABLES I–II.

EXAMPLE VI

Four (4) cordierite honeycomb test monolith of the type used in EXAMPLE I but ¾" in thickness are coated as follows:
  (a) two (2) monoliths are coated identically as in Sample 1 of EXAMPLE I and
  (b) two (2) monoliths coated identically as in Sample 2 of EXAMPLE I.

The two Sample 1 (Pd-Al₂O₃)-coated monoliths are mounted in series within a single canister about 0.3" apart with channels parallel to gas flow. The two Sample 2 (Pd-CoO-Al₂O₃)-coated monoliths are similarly mounted within a duplicate canister. After 80 and 300 hours respectively, the results are found to be comparable to that obtained and reported in EXAMPLE I and TABLE I.

What is claimed is:

1. An ozone decomposition catalyst comprising:
   (a) a carrier or support consisting of a plurality of spaced catalyst beds or monoliths arranged in series within a reaction zone;
   (b) at least one platinum group metal or catalytically-active compound thereof; and (c) at least one nonprecious Group VIII metal oxide or aluminate;
the arrangement of active material favoring exposure to ozone of the platinum group metal component over the nonprecious Group VIII metal oxide or aluminate and wherein about 1.0–7.00 T.O./ft³ Pd or higher is utilized in conjunction with NiO in a weight ratio of 1.0:0.5–5.0.

2. An ozone decomposition catalyst comprising:
   (a) a carrier or support consisting of a plurality of spaced catalysts beds or monoliths arranged in series within a reaction zone;
   (b) at least one platinum group metal or catalytically-active compound thereof; and
   (c) at least one nonprecious Group VIII metal oxide or aluminate;
the arrangement of active material favoring exposure to ozone of the platinum group metal component over the nonprecious Group VIII metal oxide or aluminate and wherein about 1.0–7.00 T.O./ft³ Pd or higher is utilized in conjunction with CoO as active material in a weight ratio of 1.0:0.5–5.0.

* * * * *